United States Patent
Stark (10) Patent No.: US 9,137,941 B2
(45) Date of Patent: Sep. 22, 2015

(54) ROW UNIT FOR A PLANTER, PLANTER AND METHOD FOR PLANTING

(75) Inventor: Magnus Stark, Skanninge (SE)

(73) Assignee: Vaderstad-Verken AB, Vaderstad (SE)

( * ) Notice: Subject to any disclaimer, the term of this patent is extended or adjusted under 35 U.S.C. 154(b) by 237 days.

(21) Appl. No.: 13/636,792

(22) PCT Filed: Mar. 22, 2011

(86) PCT No.: PCT/SE2011/050318
§ 371 (c)(1),
(2), (4) Date: Jan. 28, 2013

(87) PCT Pub. No.: WO2011/119095
PCT Pub. Date: Sep. 29, 2011

(65) Prior Publication Data
US 2013/0118393 A1    May 16, 2013

(30) Foreign Application Priority Data
Mar. 23, 2010 (SE) ...................... 1050271

(51) Int. Cl.
*A01C 5/06* (2006.01)
*A01C 7/04* (2006.01)
(Continued)

(52) U.S. Cl.
CPC . *A01C 7/04* (2013.01); *A01C 5/064* (2013.01); *A01C 5/068* (2013.01); *A01C 7/082* (2013.01); *A01C 7/206* (2013.01)

(58) Field of Classification Search
CPC ............ A01C 5/00; A01C 5/06; A01C 5/062; A01C 5/066; A01C 5/068; A01C 7/00; A01C 7/04; A01C 7/042; A01C 7/08; A01C 7/081; A01C 7/082; A01C 7/084; A01C 7/10; A01C 7/20; A01C 7/201; A01C 7/206; A01C 5/064

USPC ................ 111/163–169, 157, 149, 189–196, 111/134–137, 174, 170, 14
See application file for complete search history.

(56) References Cited

U.S. PATENT DOCUMENTS 4,307,674 A    12/1981 Jennings et al.
4,590,869 A    5/1986 Steilen
(Continued)

FOREIGN PATENT DOCUMENTS

DE    10 2005 022 736 A1    11/2006
EP    0 216 057    4/1990
(Continued)

OTHER PUBLICATIONS

International Preliminary Report on Patentability issued Sep. 25, 2012, in PCT/SE2011/050318 filed Mar. 22, 2011.
(Continued)

*Primary Examiner* — Christopher J Novosad
(74) *Attorney, Agent, or Firm* — Oblon, McClelland, Maier & Neustadt, L.L.P.

(57) ABSTRACT

A precision seeder for sowing seeds to obtain a predetermined number of plants per unit of length includes a seed discharging tube adapted to feed the seed by an excess air pressure from a seed distributing device to a seed outlet, a seed furrow opener including two sowing discs arranged at an angle relative to each other, and a resilient press surface for pressing the seed into the soil. The press surface is configured such that a direction of flow of the seeds at the seed outlet intersects or is substantially tangent to at least a portion of the press surface. The seed outlet is located between the sowing discs and, as seen in the transverse direction, inside or immediately adjacent to the periphery of at least one of the sowing discs.

16 Claims, 4 Drawing Sheets (51) Int. Cl.
*A01C 7/08* (2006.01)
*A01C 7/20* (2006.01)

(56) References Cited

U.S. PATENT DOCUMENTS

| | | |
|---|---|---|
| 4,995,325 A | 2/1991 | Herriau et al. |
| 5,092,255 A | 3/1992 | Long et al. |
| 5,425,318 A | 6/1995 | Keeton |
| 5,522,328 A | 6/1996 | Long |
| 5,640,915 A | 6/1997 | Schaffert |
| 5,673,638 A | 10/1997 | Keeton |
| 5,724,903 A | 3/1998 | Yoder et al. |
| 5,918,557 A | 7/1999 | Schaffert |
| 6,082,275 A | 7/2000 | Schaffert |
| 6,918,342 B2 | 7/2005 | Sauder et al. |
| 7,497,174 B2 | 3/2009 | Sauder et al. |
| 7,921,787 B2 | 4/2011 | Sauder et al. |
| 2007/0095261 A1* | 5/2007 | Mariman et al. ............. 111/164 |
| 2008/0184920 A1 | 8/2008 | Thompson et al. |
| 2012/0260835 A1 | 10/2012 | Stark |

FOREIGN PATENT DOCUMENTS

| | | |
|---|---|---|
| EP | 0 404 241 A1 | 12/1990 |
| EP | 1 461 988 A1 | 9/2004 |
| EP | 1 461 989 | 9/2004 |
| EP | 2 055 165 | 5/2009 |
| WO | WO 2011/078768 A1 | 6/2011 |

OTHER PUBLICATIONS

International Search Report Issued Jun. 22, 2011 in PCT/SE11/50318 Filed Mar. 22, 2011.
Extended European Search Report issued Nov. 5, 2013 in Patent Application No. 11759797.1.
Third Party Observation issued Nov. 14, 2014 in Patent Application No. 11759797.1.

* cited by examiner

ROW UNIT FOR A PLANTER, PLANTER AND METHOD FOR PLANTING

TECHNICAL FIELD

The invention relates to a row unit and a precision seeder or planter for sowing seeds to obtain a predetermined number of plants per unit of length, and more specifically to a precision seeder of the kind that uses an excess air pressure to feed seeds from the seed distributing device to a seed outlet. The invention further concerns a method for precision sowing.

BACKGROUND ART

When sowing crops such as maize, sunflowers and soya beans it is desirable to plant, in each row, single seeds at a predetermined distance from each other. This requires a device for singling out single seeds from a hopper containing many seeds. An example of such a seed distributing device is disclosed in EP-0 216 057 B1. The distributed seeds are fed by means of an excess pressure in the hopper through a tube to a seed knife, which creates a furrow in the ground into which the seeds are dropped.

In many practical applications, a seed knife is not enough to provide optimal conditions for the seed.

A seeder known in the art, which is marketed by Amazonen-Werke H. Dreyer GmbH under the name Amazone EDX and which has a seed distributing device according to EP-0 216 057 B1 mentioned above, uses a pair of sowing discs, which operate at a forwardly oriented acute angle so as to make a furrow, and where the seed knife is located partly between the sowing discs. Arranged after the seed knife is a press wheel, whose function is to apply pressure on the seed to ensure satisfactory contact between the seed and the soil, and a pair of wheels, which operate at a rearwardly oriented acute angle relative to each other to cover the seed with soil.

In seeders where the seeds are fed by means of an excess air pressure the seeds usually travel at a relatively high speed as compared with seeders where the seeds are singled out using a vacuum technique and are then allowed to drop by gravity through a seed discharging tube. Speeds of up to 15 m/s are not uncommon. The seed knife ensures here that the seed lands in the intended spot in the furrow and does not bounce off before the succeeding press wheel is able to press it down.

However, the seed knife is a wearing part, which needs to be replaced a number of times during the life of the seeder. Furthermore, when using a seed knife there is a risk that plant residues get stuck, eventually causing malfunctioning. There is also a risk that the seed knife is damaged by obstacles, such as stones, in the ground, thus causing operating disturbances.

There is therefore a need to provide a seeder that solves the above problems while maintaining its precision.

SUMMARY OF THE INVENTION

An object of the present invention is to provide a seeder that eliminates or reduces the drawbacks of prior-art seeders.

A further object is to provide a seeder that eliminates or reduces the problem associated with seed knife wear.

Yet another object is to provide a seeder that eliminates or reduces the problem of plant residues sticking to the seed knife.

The invention is defined by the appended independent claims. Embodiments of the invention will be apparent from the dependent claims and from the following description and the appended drawings.

According to a first aspect, a row unit is provided for precision sowing of seeds to obtain a predetermined number of plants per unit of length. The row unit comprises a seed discharging tube adapted to feed said seed by means of an excess air pressure from a seed distributing device to a seed outlet, a seed furrow opener comprising two sowing discs arranged at an angle relative to each other, and a resilient press surface for pressing the seed into the soil. The press surface is designed such that a direction of flow of the seeds at the seed outlet intersects or is substantially tangent to at least a portion of the press surface. The seed outlet is located between the sowing discs and, as seen in the transverse direction, inside or immediately adjacent to the periphery of at least one of the sowing discs.

By "feeding single seeds" is meant feeding of the kind that enables control of each individual seed, so that a predetermined distance between the seeds can be obtained. In practice, a large number of seeds are discharged in series from the seed hopper.

By "is substantially tangent to" is meant that the direction of flow of the seeds should be such that a discharged seed is highly likely to engage with the press surface before touching the soil. The expression also covers seed flow directions where the seed touches the soil before the press surface, but where it is sufficiently close to the press surface so as not to bounce out of the seed furrow before it is pressed down by the press surface.

The fact that the press surface is designed in such a way that a seed flow direction at the seed outlet intersects or is tangent to at least a portion of the press surface ensures that the seed discharged by means of the excess air pressure, despite its high velocity, ends up in the right position in the furrow. By arranging the seed outlet inside or immediately adjacent to the periphery of at least one of the sowing discs it can be protected from damages that could otherwise occur as a result of contact with hard portions of soil and/or objects in the ground.

Thus, the seed knife can be eliminated altogether, which eliminates the problem associated with seed knife wear. By eliminating the seed knife, the problem with plant parts sticking to the seed knife is also eliminated. Finally, the seed knife as a component is eliminated, which is advantageous both from a logistics perspective and from the perspective of production costs. The advantages for the user are that the seeder will be cheaper and less sensitive to operational disturbances. Since the seed knife has been eliminated, the seed furrow is formed essentially by the seed furrow opener. Moreover, by eliminating the seed knife the press surface can be positioned closer to the seed furrow opener. As a result, a more compact row unit can be obtained, which offers a better ability to follow the contour of the ground, less sensitivity to irregularities and more reliable seed placement since the time between the opening of the seed furrow and the placing of the seed in the furrow is reduced. The seed outlet, as seen in a plane perpendicular to the direction of flow of the seeds, can have substantially the same cross section as the seed discharging tube. The seed outlet and the seed discharging tube can, for example, be formed in one piece from a pipe, which offers a cheap and simple component.

The seed outlet as a whole can be positioned in front of a vertical plane, which is tangent to one of the sowing discs and perpendicular to a main operating direction of the row unit.

The seed outlet can be located at a distance from a horizontal plane that is tangent to a lower edge of one of the sowing discs.

The direction of flow of the seeds at the seed outlet can be at least 45 degrees relative to a vertical plane, at least 60 degrees relative to said vertical plane or at least 75 degrees relative to said vertical plane.

The press surface can be formed by a press wheel.

The press wheel can have a press part and at least one side wall, a material thickness of the side wall being smaller than a material thickness of the press part, preferably approximately 20% smaller, approximately 30% smaller, approximately 40% smaller, or approximately 50% smaller.

Alternatively, the press surface can be formed by a substantially rigid body, which is connected to said precision seeder by means of a spring element. Said substantially rigid body makes it possible to supply, in a controlled manner, for example fertilizer and/or pesticides.

As a further alternative, the press surface can be formed by an elastically resilient body. Such a solution can be achieved at a comparatively low cost.

The seed discharging tube can comprise a substantially straight portion, whose length is greater than a radius of at least one of the sowing discs.

The straight portion can be substantially vertical.

The seed distributing device can be integrated with the row unit. Consequently, a row unit of this kind can have a seed distributing device which feeds seeds to that row unit only. A row unit of this kind can also have a seed hopper of its own from which the seeds are fed.

According to a second aspect, a precision seeder comprising at least two row units according to the above is provided.

According to a third aspect, a precision seeder comprising at least two row units according to the above and a seed distributing device adapted to feed seeds to both row units is provided.

Each row unit can be designed to operate substantially independently, possibly using a compressed air supply common to all row units.

According to a fourth aspect, a method is provided for precision sowing of seeds to obtain a predetermined number of plants per unit of length. The method comprises feeding single seeds from a seed hopper by means of a seed distributing device, feeding said seed by means of an excess air pressure via a seed discharging tube from the seed distributing device to a seed outlet, opening a seed furrow by means of a seed furrow opener, comprising two sowing discs arranged at an angle relative to each other, and pressing the seed into the soil by means of a resilient press surface.

The seeds are fed through the seed outlet in such a way that a direction of flow of the seeds at the seed outlet intersects or is substantially tangent to at least a portion of the press surface.

The seeds leave the seed outlet at a position between the sowing discs and, as seen in the transverse direction, inside or immediately adjacent to the periphery of at least one of the sowing discs. This means that the seeds leave the seed outlet at a position that is sufficiently protected, without the need for using a seed knife.

According to the method, the seed furrow is formed essentially exclusively by the seed furrow opener. As a result, no seed knife is required.

DESCRIPTION OF EMBODIMENTS

Figure 1:
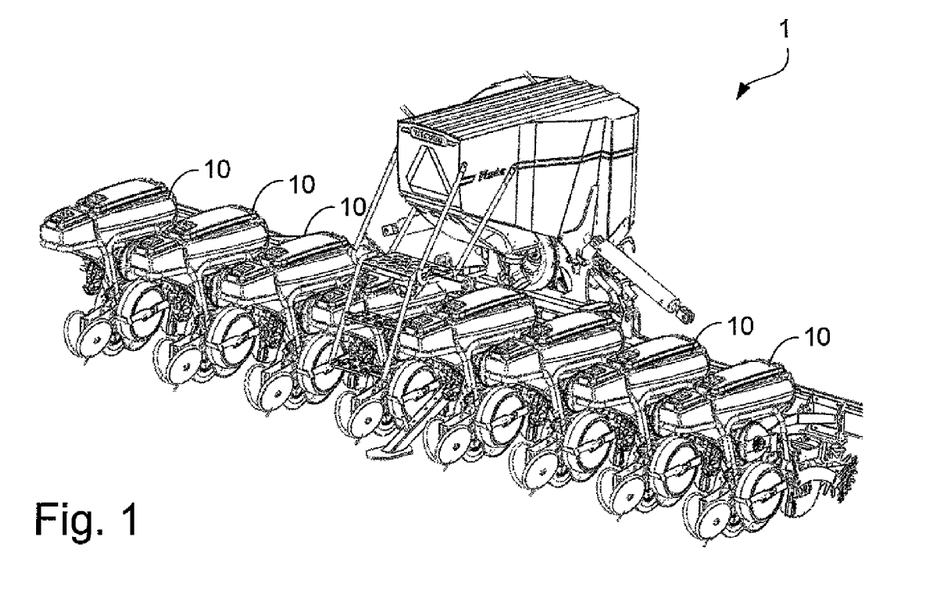
FIG. 1 is a schematic perspective view of a precision seeder.
Figure 2:
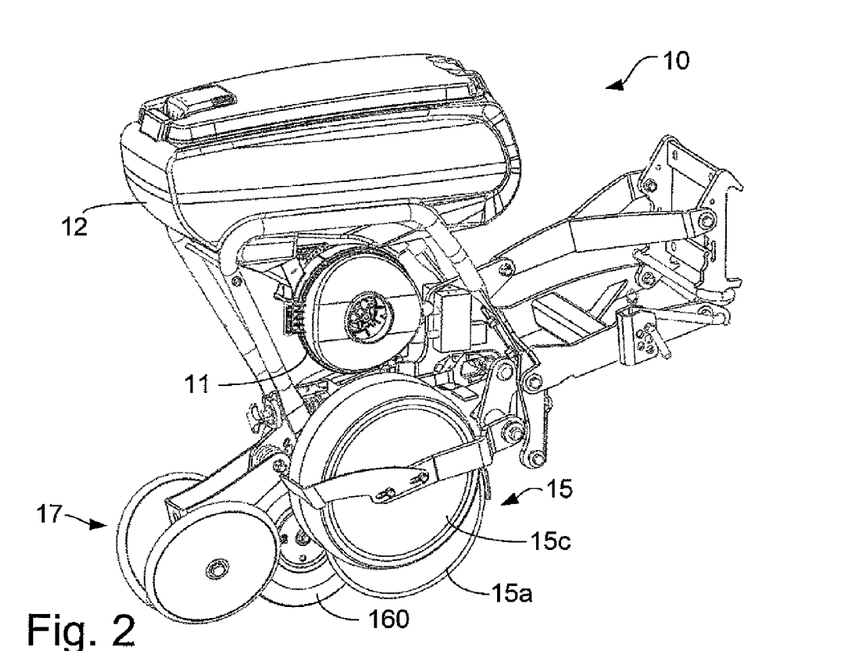
FIG. 2 is a schematic perspective view of a row unit that can be used in the precision seeder in FIG. 1.
Figure 3:
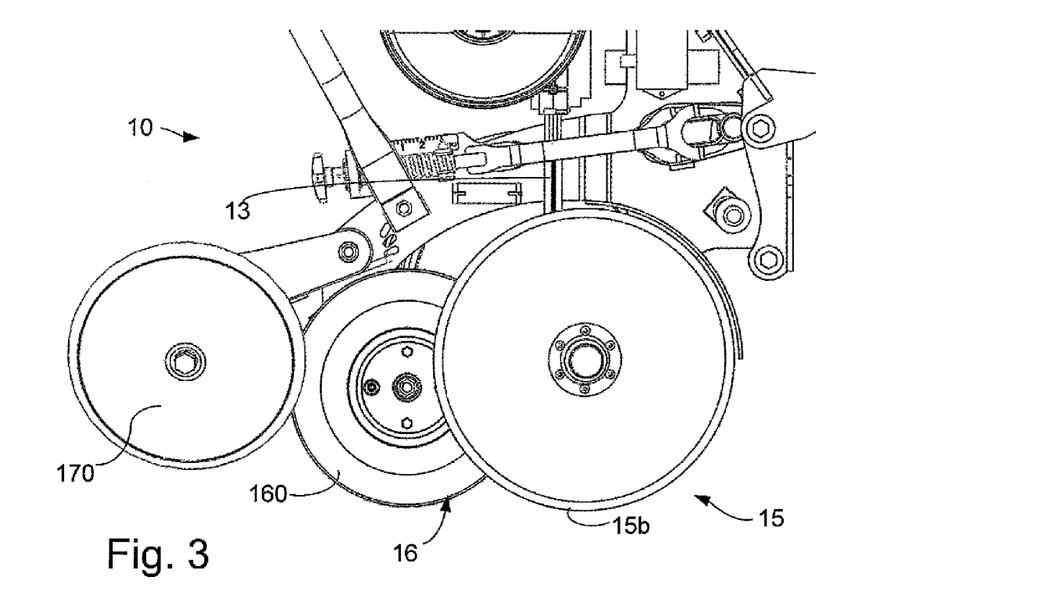
FIG. 3 is a plan view of a part of the row unit in FIG. 2.

FIG. 1 shows an embodiment of a seeder 1 comprising a plurality of row units 10, each of which has a seed distributing device 11, which is connected to a seed hopper 12 and adapted to feed single seeds from the seed hopper via a seed discharging tube 13 (FIGS. 2, 3) to a seed outlet 14.

The seed distributing device singles out seeds from the seed hopper so that a line of seeds spaced apart a predetermined distance is obtained, the line of seeds being successively fed towards the inlet (not shown) of the seed discharging tube 13, whereupon they are forced through the seed discharging tube 13 by means of compressed air.

The seed discharging tube 13 can be in the form of a pipe that extends substantially straight down from the seed distributing device 11 and is terminated by a rearwardly curved portion, immediately upstream of the seed outlet 14. The pipe can thus have a substantially straight portion, which is longer than a radius of at least one of the sowing discs 15a, 15b. The curved portion can be designed in such a way that a direction of flow F of the seeds at the seed outlet 14 is at least 45 degrees relative to a vertical plane, at least 60 degrees relative to said vertical plane or at least 75 degrees relative to said vertical plane.

The seed outlet 14 is located between the sowing discs 15a, 15b and, as seen in the transverse direction, inside or immediately adjacent to the periphery of at least one of the sowing discs 16, 16', 16". In one embodiment, at least a part of the orifice of the seed outlet is located on or inside the periphery of the sowing disc.

In one embodiment, the seed discharging tube 13 and the seed outlet 14 form an integrated unit. They can, for example, be formed from one and the same piece of pipe, one end of the pipe piece forming the seed outlet 14. The pipe can be made of a polymer material, for example plastic or rubber, or of metal.

In any case, the seed outlet 14 can be located in front of a vertical plane V, which is perpendicular to the main operating direction of the row unit and which is tangent to one of the sowing discs 15a, 15b. In one embodiment, the seed outlet 14 is located at a horizontal distance from the vertical plane V that corresponds to at least approximately 10% of the radius of at least one of the sowing discs 15a, 15b, alternatively at least approximately 20% or at least approximately 30% of the radius of at least one of the sowing discs.

Moreover, the seed outlet can be located at a vertical distance above a horizontal plane H, which is tangent to a lower part of one of the sowing discs 15a, 15b. The vertical distance can correspond to at least approximately 10% of the radius of at least one of the sowing discs, at least approximately 15% of the radius of at least one of the sowing discs, at least approximately 20% of the radius of at least one of the sowing discs or at least approximately 25% of the radius of at least one of the sowing discs.

The row unit 10 further comprises a seed furrow opener 15, which can comprise a pair of mutually angled sowing discs 15a, 15b and one or several wheels 15c, which limit the depth of sowing. Furthermore, the row unit 10 can comprise a press wheel 160, which has a press surface 16 the purpose of which is to apply pressure on the seed to ensure satisfactory contact between the seed and the soil.

Seed furrow openers having two sowing discs are known, for instance, from U.S. Pat. No. 4,590,869A, and comprise a pair of discs or wheels, which are adapted to rotate about their respective axes of rotation, which form an obtuse angle, so that the discs themselves form an acute angle with each other. At the edge opposite to the acute angle there is a space between the discs in which, for example, a seed outlet can be arranged.

Moreover, the row unit can comprise a seed furrow covering means 17, which can comprise a pair of angled wheels or discs 170. The wheels or discs 170 can be arranged at an angle opposite to that of the sowing discs, in such a way that they scrape or press soil down on top of the seed so that the seed furrow is covered.

Figure 4:
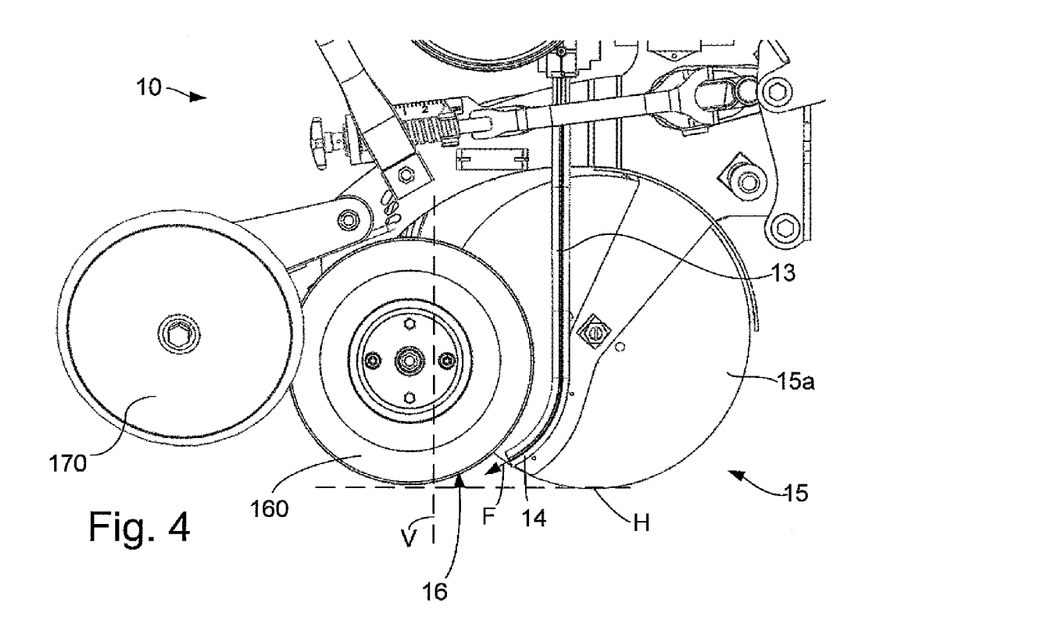
FIG. 4 is a plan view of a part of the row unit in FIG. 3, where one of the sowing discs has been removed to expose a seed discharging tube.

As shown in FIG. 4, the seed outlet is adapted to discharge the seed in an outlet direction F, which is tangent to or intersects the press surface 16. A seed that is discharged at a high speed (often nearly 15 m/s) will thus bounce off the press surface 16 and onto the ground, where it is pressed down by the press surface 16.

Figure 7:
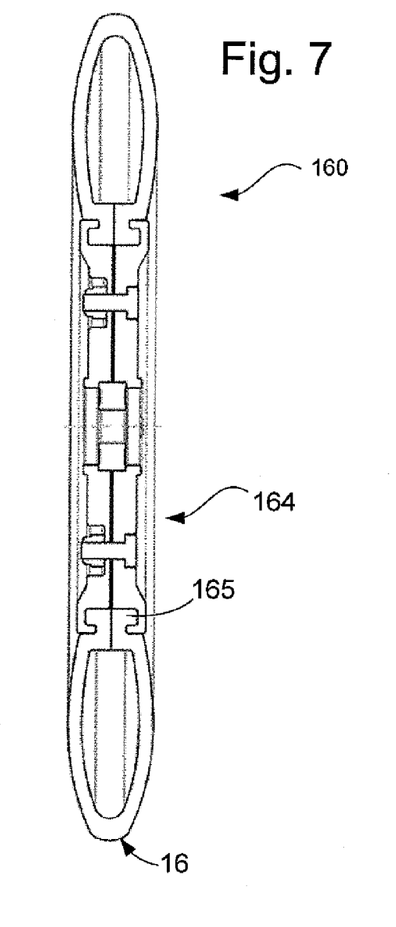
FIG. 7 is a cross-sectional view of a press wheel.
Figure 8:
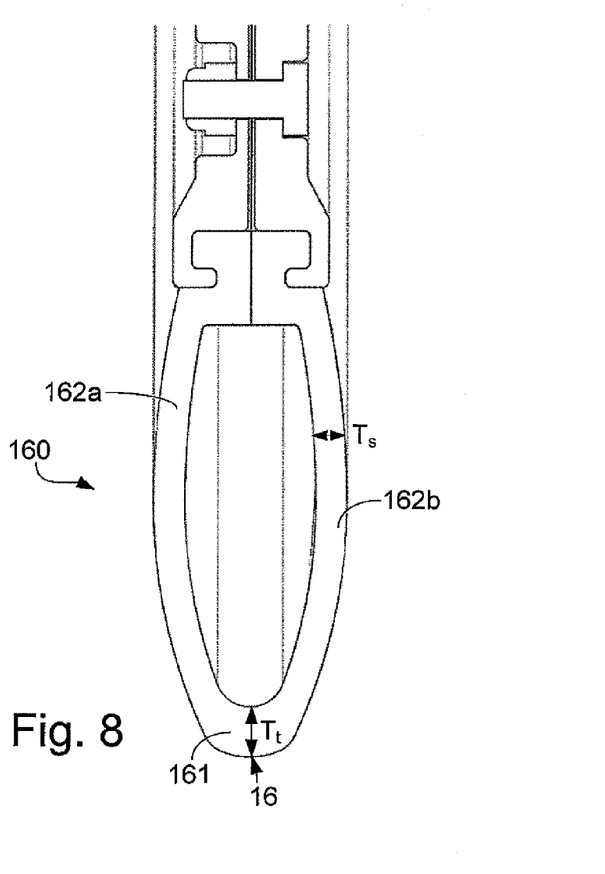
FIG. 8 is a cross-sectional view showing a detail of the press wheel in FIG. 7.

Referring now to FIGS. 7 and 8, the press wheel 160 can be provided in the form of an annular tube with an inwardly oriented flange 165, which is adapted to engage with a periphery of a rim 164. With reference to FIG. 8, the press wheel 160 can have a press part 161 that forms the press surface 16, which has a first material thickness Tt that is greater than a second material thickness Ts of a side wall 162a, 162b of the press wheel. The tube of the press wheel can be made of an elastic material such as rubber or a rubber-like material. The material thickness Ts of the side wall 162a, 162b can be smaller than a material thickness Tt of the press part 161, for example approximately 20% smaller, approximately 30% smaller, approximately 40% smaller, or approximately 50% smaller.

Figure 5:
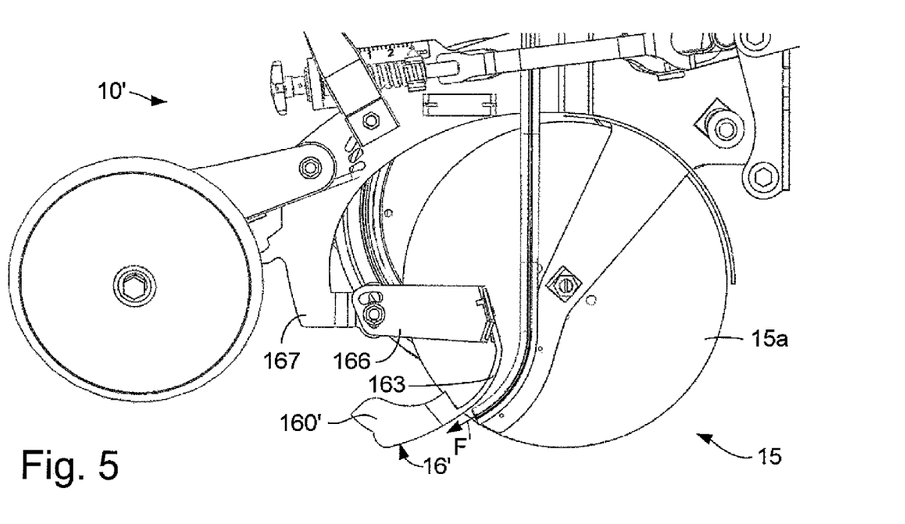
FIG. 5 is a plan view of an alternative row unit, where one of the sowing discs has been removed to expose a seed discharging tube.

With reference to FIG. 5, an alternative embodiment of a row unit 10' is shown, where the press surface 16' is formed by a substantially rigid body 160', which is arranged in a resilient manner relative to the row unit 10' by way of an elastic element 163. The rigid body 160' can be made of a polymer material or metal and the elastic element 163 can be made of a resilient material, for example spring steel. The elastic element 163 can in turn be mounted on the frame 167 of the row unit 10' by means of a spacer part 166.

Alternatively, the rigid body and the elastic element can be formed in one piece and of the same material, where the rigid body 160' and the elastic element 163 have different material thicknesses, thereby giving them different stiffness.

In this kind of embodiment, the rigid body can be provided with one or several ducts with an associated orifice (not shown) adapted for fertilizer and/or pesticides. Such ducts can be connected to a container for fertilizer and pesticide, respectively, of which there may be one for each row unit or a single one that is common to all row units of the seeder.

Figure 6:
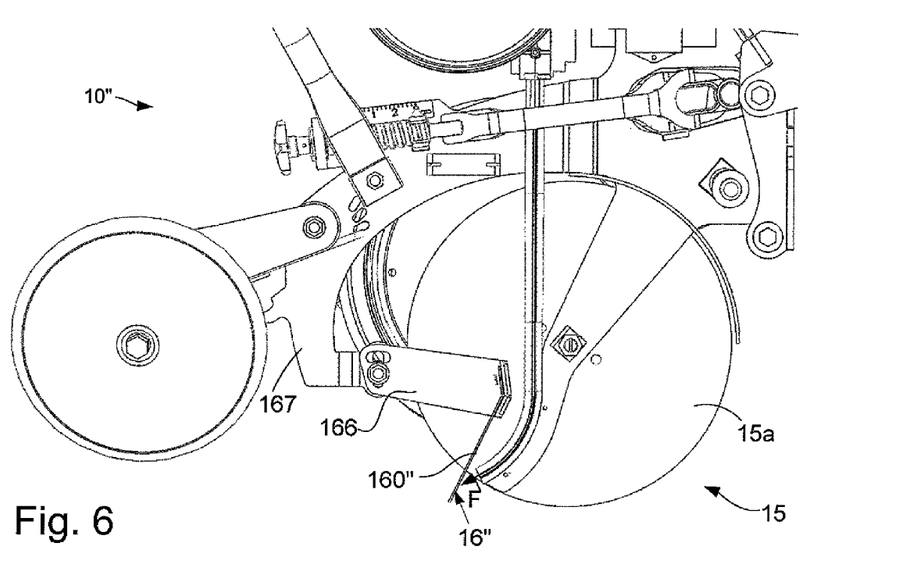
FIG. 6 is a plan view of yet another alternative row unit, where one of the sowing discs has been removed to expose a seed discharging tube.

With reference to FIG. 6, an alternative embodiment of a row unit 10" is shown, in which the press surface 16" is formed by an elastic element 160". The elastic element 160" can in turn be mounted on the frame 167 of the row unit 10' by means of a spacer part 166. The elastic element 160" can be made of metal, for example spring steel. Alternatively, a polymer material such as plastic or rubber can be used.

In the embodiment shown in FIG. 6, the elastic element can be formed from a composite material, which may include metal and a polymer material in combination. In both of the embodiments shown in FIG. 5 and FIG. 6, the press surface 16', 16" can be modified in order to obtain a durable surface, for example by applying a cemented carbide coating.

As illustrated in the drawings, the precision seeder can comprise a plurality of row units, which each have their own seed hopper, seed discharging device, etc.

Alternatively, the solution can be used in conjunction with a precision seeder where, for example, one or more seed hoppers and/or seed discharging devices are common to two or more row units, and where the seeds are fed from the respective seed discharging device via pipes or tubes, which are connected to the seed discharging device 13.

The sowing discs 15a, 15b can be of the same size and relatively offset in a longitudinal direction of the row unit. Alternatively, the sowing discs can be of different size. The sowing discs can be made of different materials, for example one made of metal and one made of a polymer material, such as rubber or plastic.

The invention claimed is:

1. A row unit for precision sowing of seeds to obtain a predetermined number of plants per unit of length, comprising:
    a seed distribution device adapted to feed single seeds from a seed hopper;
    a seed discharging tube adapted to feed the seed by an excess air pressure from the seed distribution device to a seed outlet, the seed being forced throughout the seed discharging tube by the excess air pressure;
    a seed furrow opener, comprising two sowing discs arranged at an angle relative to each other; and
    a resilient press surface for pressing the seed into the soil;
    wherein the press surface is configured such that a direction of flow of the seeds at the seed outlet intersects or is substantially tangent to at least a portion of the press surface; and
    the seed outlet is located between the sowing discs and, as seen in the transverse direction, entirely inside the periphery of at least one of the sowing discs.

2. A row unit according to claim 1, wherein the seed outlet, as seen in a plane perpendicular to the direction of flow of the seeds, has substantially a same cross section as the seed discharging tube.

3. A row unit according to claim 1, wherein the whole of the seed outlet is located in front of a vertical plane that is tangent to one of the sowing discs and perpendicular to a main operating direction of the row unit.

4. A row unit according to claim 1, wherein the seed outlet is located at a distance from a horizontal plane that is tangent to a lower edge of one of the sowing discs.

5. A row unit according to claim 1, wherein the seed outlet is configured such that the direction of flow of the seeds at the seed outlet is at least 45 degrees relative to a vertical plane, at least 60 degrees relative to the vertical plane, or at least 75 degrees relative to the vertical plane.

6. A row unit according to claim 1, wherein the press surface is formed by a press wheel.

7. A row unit according to claim 6, wherein the press wheel includes a press part and at least one side wall, a material thickness of the at least one side wall being smaller than a material thickness of the press part, or approximately 20% smaller, or approximately 30% smaller, or approximately 40% smaller, or approximately 50% smaller.

8. A row unit according to claim 1, wherein the press surface is formed by a substantially rigid body, which is connected to the precision seeder by a spring element.

9. A row unit according to claim 1, wherein the press surface is formed by an elastically resilient body.

10. A row unit according to claim 1, wherein the seed discharging tube comprises a substantially straight portion, whose length is greater than a radius of at least one of the sowing discs.

11. A row unit according to claim 10, wherein the straight portion is substantially vertical.

12. A row unit according to claim 1, wherein the seed distribution device is integrated with the row unit.

13. A precision seeder comprising at least two row units according to claim 1.

14. A precision seeder comprising:
   at least two row units according to claim 1; and
   a seed distribution device configured to feed seeds to both row units.

15. A method for precision sowing of seeds to obtain a predetermined number of plants per unit of length, comprising:
   feeding single seeds from a seed hopper by a seed distribution device;
   feeding the seed by an excess air pressure via a seed discharging tube from the seed distribution device to a seed outlet, the seed being forced throughout the seed discharging tube by the excess air pressure;
   opening a seed furrow by a seed furrow opener, comprising two sowing discs arranged at an angle relative to each other; and
   pressing the seed into the soil by a resilient press surface,
   wherein the seeds are fed through the seed outlet such that a direction of flow of the seed at the seed outlet intersects or is substantially tangent to at least a portion of the press surface; and
   the seeds are discharged from the seed outlet at a position between the sowing discs and, as seen in the transverse direction, entirely inside the periphery of at least one of the sowing discs.

16. A method according to claim 15, wherein the seed furrow is formed essentially exclusively by the seed furrow opener.

* * * * *

UNITED STATES PATENT AND TRADEMARK OFFICE
CERTIFICATE OF CORRECTION

PATENT NO. : 9,137,941 B2  
APPLICATION NO. : 13/636792  
DATED : September 22, 2015  
INVENTOR(S) : Magnus Stark Page 1 of 1

It is certified that error appears in the above-identified patent and that said Letters Patent is hereby corrected as shown below:

On the title page, Item (30), the Foreign Application Priority Data information is incorrect. Item (30) should read:

-- (30)  Foreign Application Priority Data

Mar. 23, 2010   (SE).............................1050271-4 --

Signed and Sealed this
Sixteenth Day of August, 2016

Michelle K. Lee
*Director of the United States Patent and Trademark Office*